United States Patent
Gerber et al.

[19]

[11] Patent Number: 6,092,747
[45] Date of Patent: Jul. 25, 2000

[54] AUTOMATIC PNEUMATIC CONVEYING MACHINE

[76] Inventors: Milton L. Gerber; Michael L. Gerber, both of 1625 Baker Dr., Ossian, Ind. 46777

[21] Appl. No.: 09/022,946

[22] Filed: Feb. 12, 1998

[51] Int. Cl.[7] .................. B02C 19/12; B02C 23/24
[52] U.S. Cl. .................. 241/47; 241/48; 241/186.2; 241/260.1
[58] Field of Search .................. 241/47, 48, 186.2, 241/260.1, 101.2, 34

[56] References Cited

U.S. PATENT DOCUMENTS

| | | | |
|---|---|---|---|
| 3,861,599 | 1/1975 | Waggoner | 239/654 |
| 4,111,493 | 9/1978 | Sperber | 406/64 |
| 4,191,224 | 3/1980 | Bontrager et al. | 241/43 X |
| 4,365,762 | 12/1982 | Hoshall | 241/60 |
| 4,560,307 | 12/1985 | Deitesfeld | 406/63 |
| 5,639,033 | 6/1997 | Miller et al. | 241/57 |

*Primary Examiner*—John M. Husar
*Attorney, Agent, or Firm*—Lundy and Associates

[57] ABSTRACT

In the broader aspects of the invention, there is provided a new and improved pneumatic conveying machine comprising a vertically sided hopper, and a material agitator/conditioner within the hopper. The hopper has a discharge opening at the bottom of the hopper. An air lock is positioned in the discharge opening through which shredded material is discharged into an air duct. The air blower is operatively connected to the air duct. The material can be reduced in density by the agitator/conditioner and transferred into the air stream by the air lock and conveyed continuously at a continuous rate of flow without plugging the air duct.

29 Claims, 5 Drawing Sheets

AUTOMATIC PNEUMATIC CONVEYING MACHINE

BACKGROUND OF THE INVENTION

The present invention relates to a pneumatic conveying machine, and more particularly to a new and improved insulation application machine for applying mineral wool, fiberglass, and cellulose materials into building cavities, attics and the like.

In the past, not all buildings were insulated. Primarily, those buildings built in the half of the hemisphere adjacent the equator were not insulated and those buildings built in the half of the hemisphere adjacent the poles were insulated. Then came the commercialization of air conditioning and the requirement that these existing buildings all be insulated. One way to insulate an existing building is to apply insulation such as mineral wool, fiber-glass, or cellulose materials into the walls, ceilings and attic space. Various types of insulation application machines have been proposed. Typical examples of such machines are described in U.S. Pat. Nos. 3,861,599, Waggoner; 4,111,493, Sperber; and 4,560,307, Deitesfeld et al.

Most of these insulation machines have a hopper in which the fibrous material is initially placed. These hoppers have conventionally been tapered and cause bridging of the fibrous material in the hopper. Hoppers have been provided with agitators by which the packaged fibrous material is broken apart and prepared for applying through an air duct into position within a building. Between the rotary air lock and the hopper these insulation machines usually have a manually operated slide damper which provides the primary means of controlling the feed of fibrous materials into the air lock and the air conveying systems without losing air pressure through the hopper. However, the fibrous material is also known to bridge within the hopper before it gets to the air lock. Therefore, it is highly desirable to provide a new and improved automatic pneumatic conveying machine for applying insulation materials.

All known insulation machines and systems being utilized today are manually controlled. This results in widely varying material flow rates into the pneumatic conveying ducts thereby creating over-feed conditions resulting in plugging or under-feed conditions creating excessive air and dust in the application areas.

It is therefore highly desirable to provide a new and improved pneumatic conveying machine designed to apply fibrous materials to be used as insulation, packaging materials, bedding, hydro-mulching and the like into open spaces or cavity fill applications. It is also highly desirable to provide a new and improved pneumatic conveying machine having a hopper for fibrous materials that has a live bottom agitation system allowing for the use of straight vertical sides that eliminate bridging within the hopper. It is also highly desirable to provide a new and improved pneumatic conveying machine having a recirculating ribbon agitator system to decompress packaged materials that continually overflows the machine's feeder system, thereby providing a uniform rate of conditioned feed material from the hopper into the air duct.

Normally, machine operators are not skilled sufficiently to manually control the machines to prevent plugging and to maintain optimum feed conditions. Usually, to avoid plugging problems, operators set these manual machines to underfeed, thereby greatly reducing overall production, creating excess air and dust in the application area. Thus, it is highly desirable to provide a new and improved pneumatic conveying machine by which the applied consistency of the material can be better controlled. It is also highly desirable to provide a new and improved pneumatic conveying machine by which the moisture content of the insulation material in systems where dry adhesives are commingled with the fibrous materials can be better controlled. It is also highly desirable to provide a new and improved pneumatic conveying machine by which the feeding of the various materials into the pneumatic duct system can be better controlled.

In some of the prior art machines, an air lock is located between the damper system and the air duct such that fibrous material can be added to the air duct without a loss of air pressure within the duct through the hopper. As it may be necessary to apply fibrous material several hundred feet and to elevations several stories high, maintaining air pressure within the air duct is necessary. This is difficult without an efficient air lock between the hopper and the air duct. Therefore, it is highly desirable to provide a new and improved air lock for a pneumatic conveying machine. It is also highly desirable to provide a new and improved air lock in which an air seal between the hopper and the air duct is always maintained. It is further highly desirable to provide a new and improved control means by which the materials to be conveyed can be fed into the air stream at controlled rates so as to minimize or eliminate plugging in the air duct.

The inventors have discovered that the material handling capacity of a pneumatic conveying machine or system is directly related to the conveying duct diameter, conveying lift, material particle or fiber size, material density, atmospheric conditions such as temperature and humidity and the air velocity within the duct. All of these parameters impart a greater or lessor resistance to the air and material flow through the conveying ducts which can be effectively measured as system air back pressure.

In order to completely eliminate plugging of the air duct, there needs to be a way to monitor the quantity of material being fed into the air lock and a way to automatically vary the rate of feed into the conveying duct as the consistency and the properties of the feed material varies. The composition of insulation materials varies greatly by moisture content, fiber size and density within small lots. The dampers, set by hand, cannot be adjusted fast enough to eliminate dusty conditions and plugging. Therefore, it is highly desirable to provide a new and improved pneumatic conveying machine by which the amount of material fed to the conveying duct can be automatically varied as the properties of the material application conditions varies. It is also highly desirable to provide a new and improved pneumatic conveying machine which with an automatic feed control system designed to maintain a steady and maximum flow of feed stock into the pneumatic conveying duct resulting in substantially greater production rates at a given energy input without causing conveying dust or plugging. It is also highly desirable to provide a new and improved pneumatic conveying machine which has a fully automatic feed control system designed to accurately proportion the addition of water or other additives in direct ratio of the feed stock flowing into the conveying ducts. It is also highly desirable to provide a new and improved pneumatic conveying machine which has a fully automatic feed control system that is designed to automatically adjust and balance the material feed rate into the machine's handling capacity of the pneumatic conveying duct to accommodate continual and widely varying physical properties of the feed stock and application conditions such as duct length and lift as may be required in specific applications. It is also highly desirable to provide a new and improved pneumatic conveying machine that is electrically operated and driven which consumes significantly less power for given output rates. It is also highly desirable to provide a new and improved pneumatic conveying machine which is completely automatically driven by an internal combustion engine.

It is finally highly desirable to provide a new and improved automatic pneumatic conveying machine which encompasses all of the above features as integral components of the machine, or separate components remotely connected to the machine.

SUMMARY OF THE INVENTION

It is an object of the invention to provide a new and improved automatic pneumatic conveying machine for applying insulation materials.

It is also an object of the invention to provide a new and improved pneumatic conveying machine designed to apply fibrous materials to be used as insulation, packaging, bedding, and the like into cavity fill applications.

It is also an object of the invention to provide a new and improved pneumatic conveying machine having a hopper for fibrous materials that has a live bottom agitation system allowing for the use of straight vertical sides that eliminate bridging within the hopper.

It is also an object of the invention to provide a new and improved pneumatic conveying machine having a recirculating agitator system that continually overflows the machine's feeder system, thereby providing a uniform rate of feed of material from the hopper into the air duct.

It is also an object of the invention to provide a new and improved pneumatic conveying machine by which the applied consistency of the material can be better controlled.

It is also an object of the invention to provide a new and improved pneumatic conveying machine by which the moisture content of the insulation material in systems where dry adhesives are commingled with the fibrous materials can be better controlled.

It is also an object of the invention to provide a new and improved pneumatic conveying machine by which the feeding of the various materials into the pneumatic duct system can be better controlled.

It is an object of the invention to provide a new and improved air lock for a pneumatic conveying machine or system.

It is also an object of the invention to provide a new and improved air lock in which an air seal between the hopper and the air duct is always maintained.

It is further an object of the invention to provide a new and improved air-lock with a rotor designed to reduce the torque required to operate and substantially increase the life of the air seals.

It is further an object of the invention to provide a new and improved control means by which the materials to be conveyed can be fed into the air stream at controlled rates so as to minimize or eliminate plugging in the air duct.

It is an object of the invention to provide a new and improved pneumatic conveying machine by which the amount of material fed to the conveying duct can be automatically varied as the properties of the feed material and application conditions vary.

It is also an object of the invention to provide a new and improved pneumatic conveying machine which with an automatic feed control system designed to maintain a steady and maximum flow of feed stock into the pneumatic conveying duct resulting in substantially greater production rates at a given energy input without resulting in overfeed or underfeed conditions.

It is also an object of the invention to provide a new and improved pneumatic conveying machine which has a fully automatic feed control system designed to accurately proportion the addition of water or other additives in direct ratio to the feed stock flowing into the conveying ducts.

It is also an object of the invention to provide a new and improved pneumatic conveying machine which has a fully automatic feed control system that is designed to automatically adjust and balance the feed material rate into the machine handling capacity of the pneumatic conveying duct to accommodate continual and widely varying physical properties of the feed stock and application conditions such as duct length and lift as may be required in specific applications.

It is also an object of the invention to provide a new and improved pneumatic conveying machine that is electrically operated and driven which consumes significantly less power for given output rates.

It is also an object of the invention to provide a new and improved pneumatic conveying machine which is completely automatically driven by an internal combustion engine.

It is finally an object of the invention to provide a new and improved automatic pneumatic conveying machine which encompasses all of the above features as integral components of the machine, or separate components remotely connected to the machine.

In the broader aspects of the invention, there is provided a new and improved pneumatic conveying machine comprising a vertically sided hopper, and a material agitator/conditioner within the hopper. The hopper has a discharge opening at the bottom of the hopper. An air lock is positioned in the discharge opening through which shredded material is discharged into an air duct. The air blower is operatively connected to the air duct. The material can be reduced in density by the agitator/conditioner and transferred into the air stream by the air lock and conveyed continuously at a maximum rate of flow without plugging the air duct.

BRIEF DESCRIPTION OF THE DRAWINGS

The above-mentioned descriptions and other features and objects of the invention and the manner of attaining them will become more apparent and the invention itself will be better understood by reference to the following description of a specific embodiment of the invention taken in conjunction with the accompanying drawings wherein.

DESCRIPTION OF A SPECIFIC EMBODIMENT

The new and improved pneumatic conveying machine 10 of the invention is shown in FIGS. 1–5. The machine 10 has an instrument panel 12, a hopper 14 having an open top 16, and an enclosed motor and blower cabinet 18.

Figure 1:
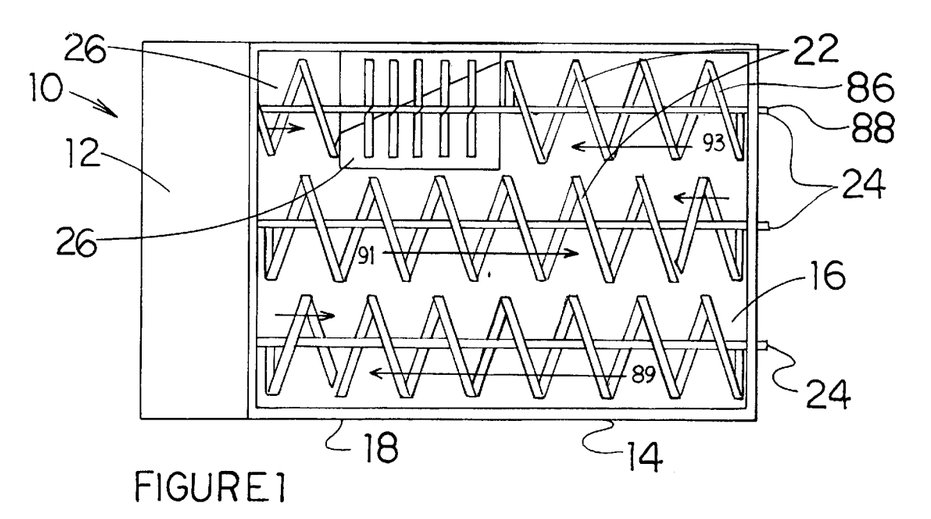
FIG. 1 is a top planar view of the new and improved pneumatic conveying machine of the invention showing spiral insulation agitators.
Figure 2:
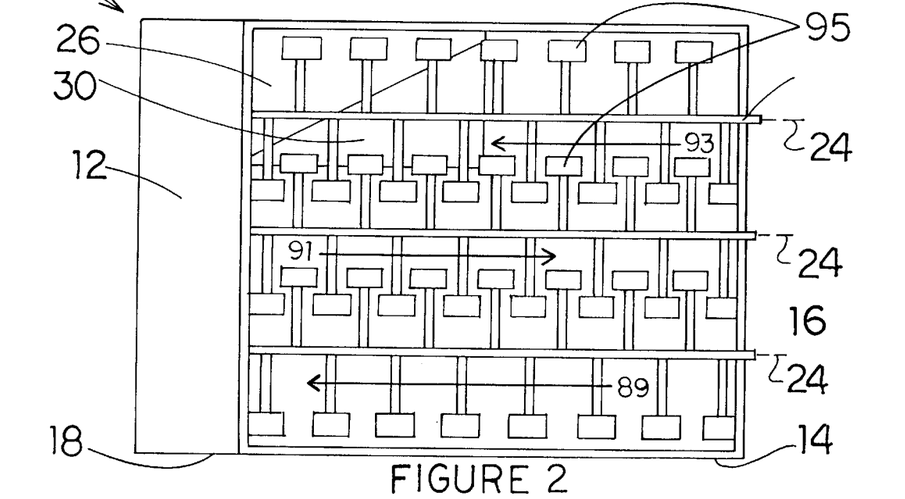
FIG. 2 is a top planar view of the pneumatic conveying machine shown in FIG. 1 showing paddle insulation agitators or conditioners.

In the hopper 14 adjacent the hopper bottom 20, are a plurality of feed material agitators 22. Feed material agitators 22 are generally cylindrical in shape and are mounted for rotation about axes 24 which are generally parallel to each other and extend generally over the entire hopper bottom 20 as shown in FIGS. 1 and 2. Hopper bottom 20 has an air lock opening 26 which provides access from the hopper 14 into the air lock 28. Air lock opening 26 is adjustable in size by means of a damper 30 which can be manually adjusted so as to completely close air lock opening 26, or to completely open air lock opening 26 or to adjust the size of air lock opening 26 to any size in between. Sides of hopper 14 are shown to be generally vertical and the hopper bottom 20 of hopper 14 is shown to be generally horizontal. However, in a specific embodiment, the sides are sloped inwardly and downwardly from the vertical toward air lock opening 26.

Figure 3:
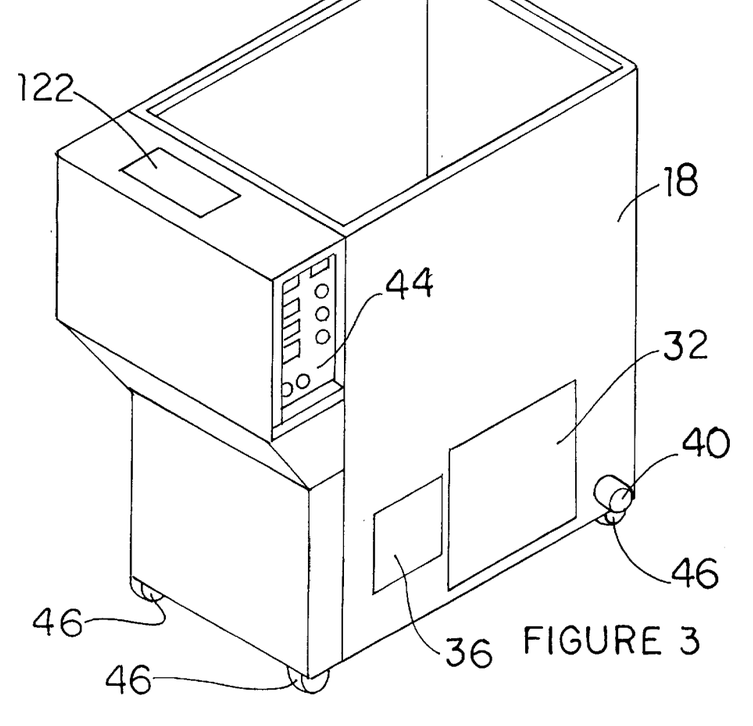
FIG. 3 is a perspective view of the new and improved pneumatic conveying machine shown in FIGS. 1 and 2.

On the front side of the cabinet 18 shown in FIG. 3 there is located an air filter 32 which filters the air being drawn into the blower 34, a panel door 36 providing access to the manual adjustment hand wheel 38 for the damper 30, a blower outlet 40 to which a hose 42 is connected to transport the airborne insulation to the desired location within a building being insulated, and a control panel 44. In a specific embodiment, hose 42 may be several hundred feet long. Control panel 44 is illustrated in FIGS. 6 and 7 and will be discussed hereinafter.

Cabinet 18 is supported by casters 46 such that the improved pneumatic conveying machine 10 of the invention is completely portable. In a specific embodiment, each of the casters 46 are equipped with a lock (not shown) whereby the machine 10 can be positioned as desired and locked in place.

Figure 6:
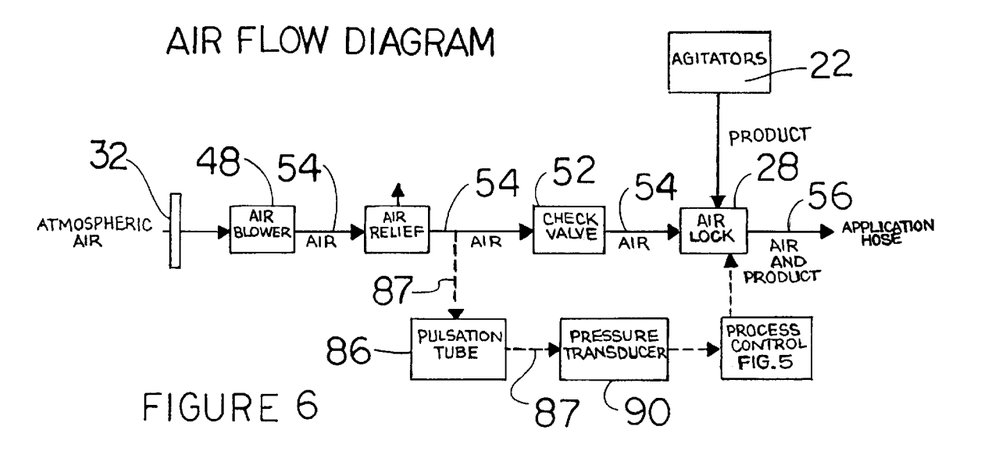
FIG. 6 is a schematic diagram of the air flow system of the new and improved pneumatic conveying machine shown in FIGS. 1 through 5.
Figure 7:
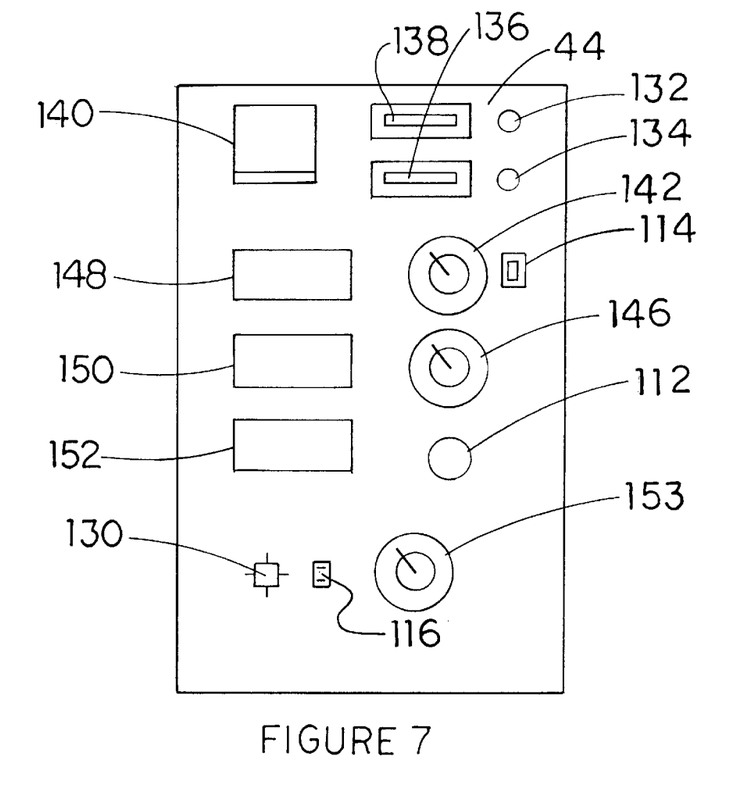
FIG. 7 is an enlarged view of the control board showing the instrument panel and the operator set point controls of the new and improved pneumatic conveying machine shown in FIGS. 1 through 6.

Referring now to FIG. 6, there is shown the air flow within the machine 10 and the control loop of the control circuitry, both of which will be described in more detail hereinafter. Air is drawn from the atmosphere into the air blower 48 through the filter 32 and is driven through a pressure relief valve 50 and through an air flow check valve 52 and through the air lock 28 and out the outlet 40 into the application hose 42. In a specific embodiment illustrated in FIG. 8, air exiting the air blower 48 is delivered through an inlet hose 54 to the air lock 28. The airborne insulation is exited from the air lock 28 through an outlet hose 56 to the outlet 40. A motor 58 is mounted to a platform 60 and is secured in spaced apart relationship over the outlet hose 56 and drives the blower 48 by means of a belt 80 and pulleys 62, 64 on the motor shaft 66 and the blower shaft 68, respectively. Mounted at the same level as blower 48 in cabinet 18 is a gearmotor 70 for driving the air lock 28 and the insulation agitators 22. Gearmotor 70 has a motor shaft 72 and a sprocket 74. As best seen in FIG. 3, each of the insulation agitators 22 have a sprocket 76, and air lock 28 has a sprocket 78. A chain 80 extends between the gearmotor sprocket 74 and the far left agitator sprocket 76; a second chain 82 extends between the air lock sprocket 78 and the far right agitator sprocket 76. A third chain 83 extends between the far right and the center agitator sprockets 76. A fourth chain 84 extends between the far left and the center agitator sprockets 76.

Each of the ribbon agitators or conditioners 22 are generally cylindrical in shape. These agitators, however, can take several forms and specific embodiments. In FIG. 1, agitators 22 are shown to include a spiral ribbon flight 85 which spirals around the axes 24 and is secured to the shafts 87 thereof. Spiral flight 85 defines the exterior cylindrical shape and when rotated acts to move the insulation material in the direction of the rotation, and thus, longitudinally of the axes 24 to the end of the agitator where the directional hand of the flights are reversed to eject the flow to the adjacent agitator. The movement also throws the insulation material by centrifugal force outwardly thereof so as to be engaged by an adjacent agitator 22 and to be moved in the direction toward the air lock opening 26. In the specific embodiment illustrated in FIG. 1, the lower spiral flighting 85 moves in the direction of arrow 89, the middle spiral flighting 85 moves the insulation in the direction of arrow 91, and the upper spiral flighting 85 moves the insulation in the direction of arrow 93. The interaction between the insulation agitators 22 of FIG. 1 breaks up clumps and presents to the air lock 26 insulation of generally consistent properties.

In an alternative agitator design as shown in FIG. 2, paddles 95 extend radially from the shaft 87 in spaced apart fashion along the length of the shaft. The paddles 95 of adjacent agitators 22 are positioned between the paddles of the other agitator 22. Additionally, the paddles 95 may be angled as shown so as to move the insulation material axially of the shafts 87 in the direction of arrows 89, 91 and 93. Additionally, in a specific embodiment, adjacent paddles 95 rotate in opposite directions such that the paddles 95 force the insulation through the agitators 22 toward the bottom 20. The combination of forcing the insulation toward the bottom 20 and axially moving the insulation in the direction of the arrows 89, 91 and 93 toward air lock 26 as with the embodiment shown in FIG. 1.

The electronic process control system embodied in this invention is comprised of a closed-loop feedback circuit where the differential pressure transmitter 90 produces a signal proportional to the measured pressure in the air duct 59 which is then compared to the reference input or set point provided by the potentiometer 146. When a difference in these values occur, the PID (proportional plus integration plus derivative control action) controller 92 will cause the feed motor controller 94 to change the speed of the air-lock feeder 28 to correct the difference or imbalance in the values. Alternately, the PID controller 94 functions and the motor controller 94 functions can be combined into a single integrated control unit.

Figure 4:
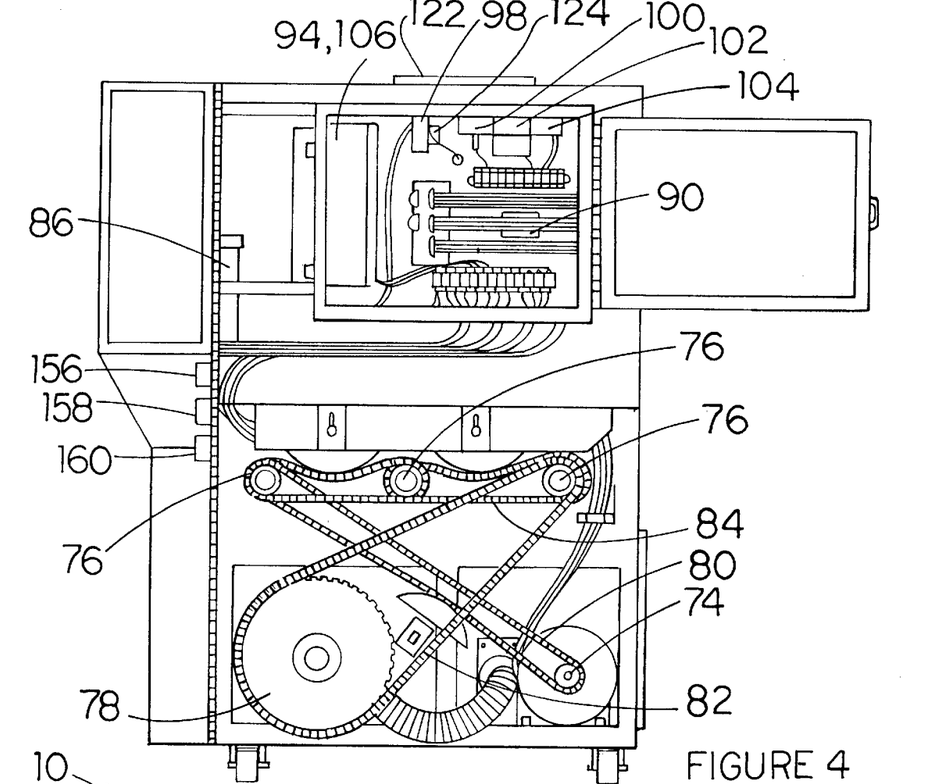
FIG. 4 is an end view of the new and improved pneumatic conveying machine shown in FIGS. 1 and 2 showing the left hand end as illustrated in FIG. 1 with the panels removed.
Figure 5:
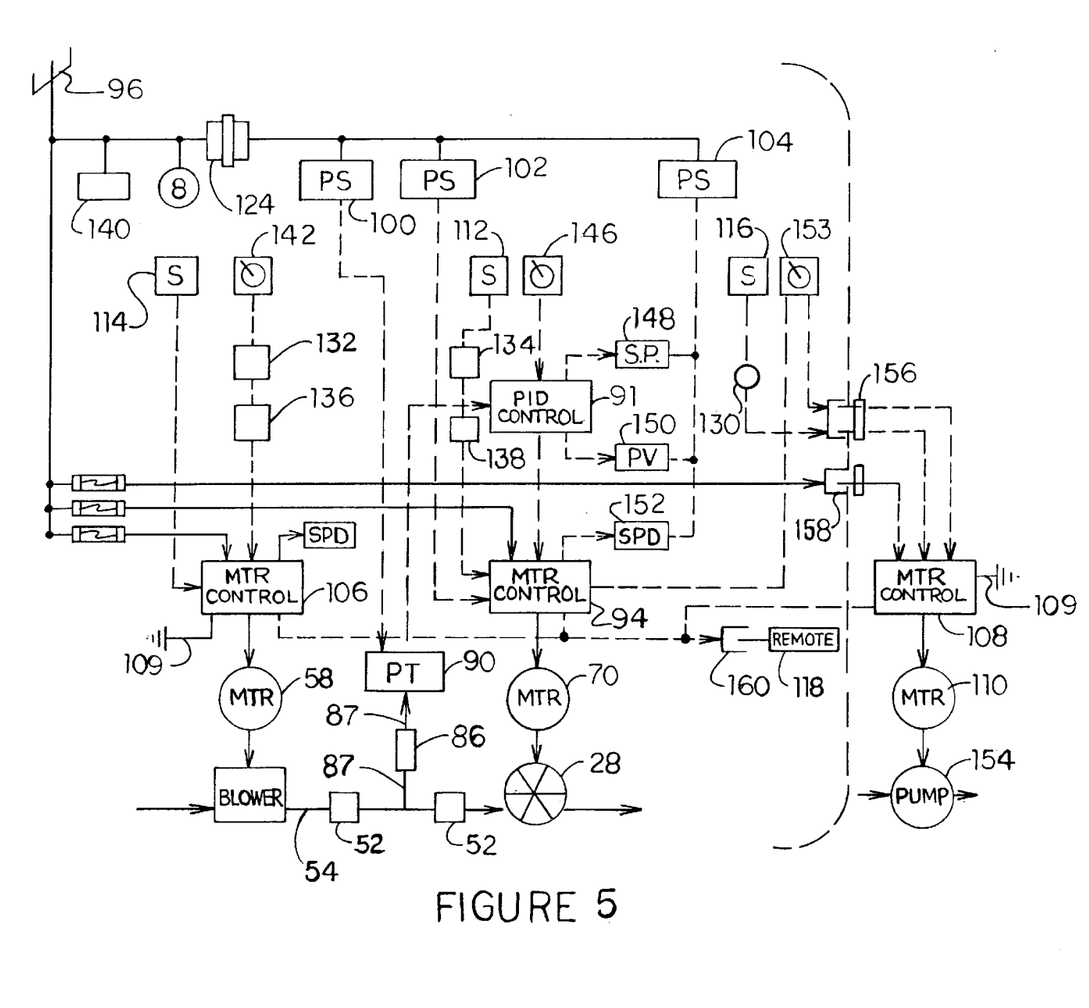
FIG. 5 is an electrical schematic diagram of the control circuitry of the new and improved pneumatic conveying machine illustrated in FIGS. 1 through 4.

Referring to FIGS. 4–7, the control circuitry of the invention will now be described. As shown in FIGS. 4 and 5, a pulsation tube 86 is connected by an air hose 88 to the air duct or inlet hose 54 between the air relief valve 50 and the check valve 52. The pulsation tube 86 dampens the variants in the air flow through the inlet hose 54 and maintains generally the same pressure as the inlet hose 54. The pulsation tube 86 is connected to a pressure transducer 90 by an air hose 87. The pressure transducer 90 in turn is connected to the PID controller 91 which in turn is connected to motor controller 94 which in turn is connected to feed motor 70. Power source 96 is connected to AC/DC power supplies 100, 102 and 104. AC/DC power supply 100 is connected to pressure transmitter 90. Motor controller 106 is connected to motor 58 and AC/DC power supply 102 is connected to motor controller 94 and power supply 104 is connected to indicators 148, 150, and 152. A third motor controller 108 is connected to a remote water pump motor 110 which will be described hereinafter. Motor controllers 94, 106 and 108 are grounded at 109.

On/Off switch 112 is connected to motor controller 94 and motor 70. On/Off switch 114 is connected to motor controller 106 and motor 58. On/Off switch 116 is connected to motor controller 108 and motor 110. A remote control 118 is connected to each of the on/off switches 112 through 116. Control panel fan 120 is connected to power source 96 which draws air through an air filter 122 located in the top of instrument box 12. Isolation transformer 124 is connected between the power source 98 and the control panel 44. Control panel 44 is connected to the PID controller 92 and motor controllers 94, 106 and 108. Circuit breakers 136 and 138 with motor controller reset buttons 132 and 134 are also positioned on the control panel 44. Circuit breakers 136 and 138 are connected respectively to motor controllers 94, 106 and motors 58, 70. Reset buttons 132 and 134 are respectively connected to motor controller 94 and 106. Potentiometer 142 is connected to motor controller 106 so as to vary the speed of motor 58 and the amount of air supplied to inlet hose 54. Emergency On/Off switch 112 is connected to motor controller 94 so as to provide a shut down of air lock 28 and the insulation agitators 22. A potentiometer 146 is connected to PID controller 94 to provide a reference set point for the feed PID controller. Indicators 148, 150 and 152 are provided to give an indication of the set point of the PID feed controller 92, the process variable (PV) indicator 150 and the speed of motor 58, respectively.

Motor 110 drives a water pump 154 which delivers water or other additives to the outlet hose 56 as desired. Motor 110, water pump 154 and motor controller 108 are each separate from the insulation blower 10, as illustrated in FIGS. 1–3, and can be a conventional water pump of the desired capacity. On/off switch 116 is connected to motor controller 108 and pilot light 130. Motor controller 94 is interlocked with motor controllers 106 and 108 such that whenever motor 70 stops so also does motor 110. Ratio control potentiometer 153 sets the speed of motor 110 as a percentage of motor 70 speed. Motor controller 108 is also interlocked with motor controller 106 such that whenever motor 58 stops, motor 110 also stops. Electrical receptacles 156, 158 and 160 are provided exterior of cabinet 18 as shown in FIG. 3 for connection of remote control 118, the water pump 154 and motor 110, and other accessories to be driven by the power source of the machine 10. Receptacles 156, and 160 are directly connected to power source 96. Receptacle 158 is connected to the additive ration potentiometer 153 and motor controller 94.

Figure 8:
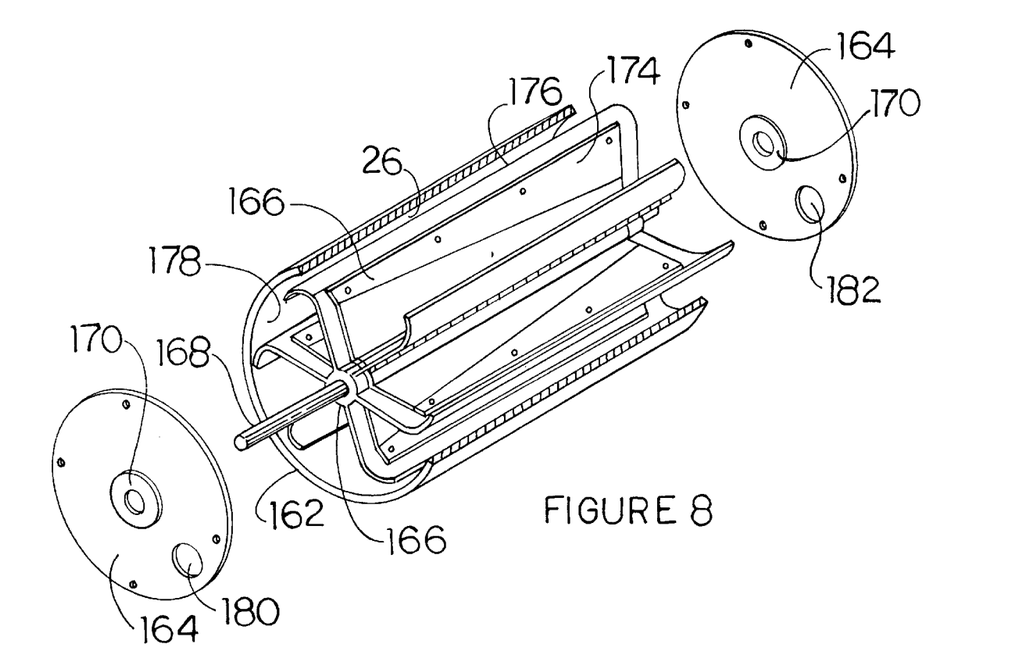
FIG. 8 is a perspective view of the spiral rotor of the air lock of the new and improved pneumatic conveying machine of the invention.
Figure 9:
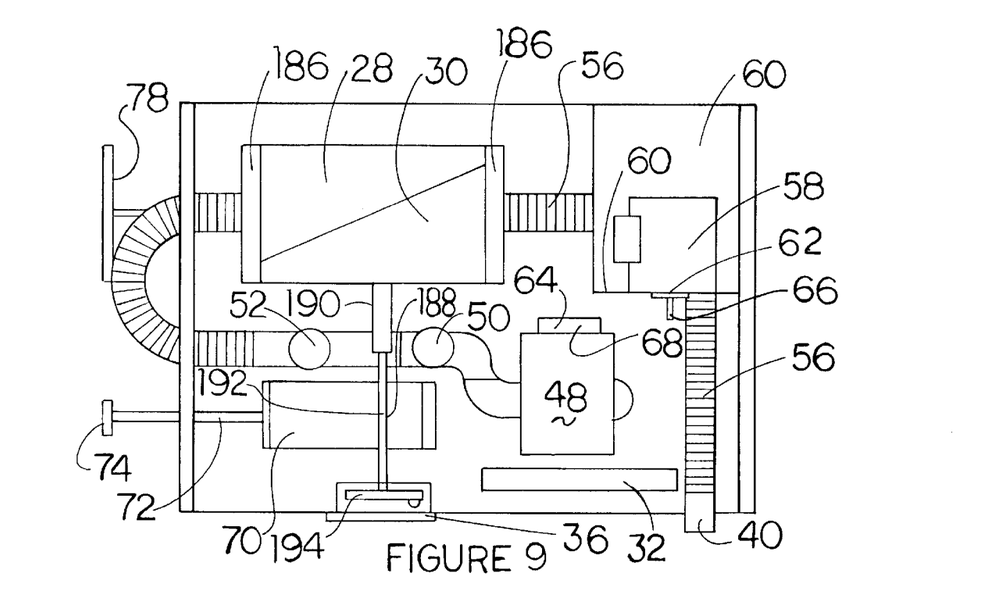
FIG. 9 is a top plan view with the hopper removed showing the air blower and air lock mechanisms as installed.

Referring to FIG. 8, the air lock 28 is shown to have an air lock casing 162 which is generally cylindrical in shape having opposite end caps 164 enclosing the casing 162. Within the casing 162 is an air lock rotor 166 which includes a longitudinal shaft 168 which is mounted for rotation by bearings 170 in the end caps 164 and extends longitudinally outwardly to be secured to sprocket 78. Secured to the shaft 168 are a plurality of veins 174, each of which extend generally radially of the shaft 168 and have at their distal ends and opposite ends a resilient seal 176 which respectively wipes the interior surface 178 of the casing 162 and the end caps 164 to provide an air seal between the rotor 166 and the casing 162. Mounted within the end caps 164 is an air inlet opening 180 and an air outlet opening 182 to which inlet hose 54 and outlet hose 56, respectively, are secured. Casing 162 is provided with air lock opening 26 at a top position opposite the location of the air inlet and outlet 180, 182, respectively. Veins 174 are bent at the distal edge at a compound angle to cause a progressive contact with the opening 26 and affixed to the shaft 168 and its axis such that the air seal around the inlet and outlet is made and broken gradually so as to reduce shock to the seals and reduce the torque required to drive the air lock. In this regard, the rotor 166 is shown to have six (6) generally radial veins 174 and the inlet and outlet 180, 182, respectively, are shown to have a diameter less than the cross sectional area between the veins 174. The air lock opening 26 is larger than the spacing between the veins 174 and provides access to the space between more than one pair of veins 174 when fully opened. A manually operated course feed damper 30 is provided to open and close the air lock opening 26 for special applications. The damper 30 is slideably supported in oppositely facing grooves 186 at the opposite ends of the air lock opening 26. The damper 30 is moved between an open position as shown in FIG. 9 to a fully closed position by means of a threaded rod 188. Threaded rod 188 has a female portion 190 secured to the damper 30 extending generally transversely of the machine 10 over the motor 70. The rod 188 also has a male portion 192 which is connected to a hand wheel 194 to which access is presented through a door 36 in the lower portion of the cabinet 18, generally below the control panel 44 and to the left side of the filter 32 as shown in FIG. 2. Damper 30 may be opened or closed by rotating the hand wheel 194. In a specific embodiment, the hopper 14 has an open top measuring approximately 33 inches by 46 inches and a capacity of about 130 pounds of insulation. Air lock opening 26 is about 13 inches by 19 inches. A machine of this size, built in accordance with the above disclosure, has a capacity of applying about three thousand (3,000) pounds of insulation per hour without shut downs. Typically insulation may be applied utilizing one hundred-fifty (150) feet of hose and a twenty (20) foot lift. Since the insulation can be applied without down time due to plugging the conveying hoses and attachments, man-hours per job has been reduced up to 50% from normal experience for cavity fill applications. Additionally, when a machine of this size is electrically powered, power consumption is less than 20 amps in normal operating conditions on single phase 240 volt power source. The blowing machine 10 of the invention is known to operate at less than 20% of the energy consumption of competing machines. In operation, once the operator verifies that both the air blower breaker 138 and the feed breaker 136 are in an off position, the machine 10 is connected to a power source by the plug 96. Power sources must be verified to be between 205 VAC and 245 VAC before continuing by reading the voltage meter 140. If a portable generator is used, a 6 kilowatt generator is recommended. The damper 30 is fully closed unless the machine 10 has been previously used under the same conditions and the damper setting is known. The air on/off switch 114 and the feed on/off switch 112 are turned on and the feed set point is adjusted by the potentiometer 146. The feed set point is adjusted to about 90% to about 95% for open fill applications. The air blower speed is then adjusted to 90% by the potentiometer 146. The air blower 48 circuit is energized by closing the on/off switch 114. The feed mechanism circuit including the agitators 22 and the air lock 28 are energized by closing the switch 112. The operator then waits until the percentage of feeder speed reaches 90% to 100% in the indicator 152. If the process value (PV) indicated in the indicator 150 is less than the set point previously set, the manual damper 30 is opened one revolution of the hand wheel 194 at a time until the process value (PV) can balance to the set point. Optimum machine performance is realized when the process value (PV) is equal to the set point value. If the percentage feeder speed as indicated by the indicator 152 remains below 80%, the operator may close the manual damper 30 slowly by rotating the hand wheel 194 until the percentage of speed is indicated between 85% and 95%. For cavity fill applications the process value (PV) is normally adjusted at 60% to 80%. Adjustment of the air speed may be necessary to minimize excessive air as observed by the operator.

During the operation, insulation material may need to be added to the hopper 14 depending upon the quality of fibrous material being used. Moisture is added to the insulation material at some point downstream in the conveying duct when water soluble adhesives are used in the insulation material. The proper moisture content can be determined by the observation of an experienced operator and the ratio of fiber to water can be adjusted with the potentiometer 153. When air switch 114 is turned on, motor 58 will be energized and will drive the blower 48. The blower 48 will draw air in through the filter 32 and will blow air through the air relief valve 50 and the check valve 52 and into the air lock 28 and out through the outlet 40 and hoses 56 and 42. After a very short amount of time, the pressure within this air system will become relatively constant and the air line to the pulsation tube 86 and the air line 88 to the pressure transducer 90 will provide the pressure transducer 90 with an air pressure substantially equal to the air pressure in inlet hose 54 and will run the air lock 28 at a constant speed for that condition. Whenever an overfeed condition occurs, the air back pressure in the inlet hose 54 increases causing the pressure to increase in line 88 to the pulsation tube 86 and in line 92 to the pressure transducer 90. The pressure transducer 90 then sends a signal to the PID controller 92 and the PID controller will send a signal to motor controller 94 which then slows the rotation of the air lock 28 until the overfeed condition is normalized. This is accomplished by driving the air lock 28 with a variable speed gearmotor 70 as will be mentioned hereinafter. When the feed switch 112 is closed, both the air lock 28 and the agitators 22 are rotated by the motor 70. Motor 70 when energized drives the sprocket 74 attached to its shaft 72 and by the chain 80 drives the sprocket 76 and by the chain 84 and drives the sprocket 78 of the air lock by the chain 82. (See FIG. 4.)

In a specific embodiment, the sprocket 76 has fifteen (15) teeth, sprocket 78 has seventy (70) teeth. Sprocket 74 has twenty-two (22) teeth. Cross agitators 22 rotate at a speed from about 15 rpm to about 311 rpm, and air lock 28 rotates at a speed from about 3 rpm to about 67 rpm. As the air lock 28 is driven, the rotor 166 rotates within the casing 162. The veins 174 of the rotor 166 form a seal 176 between the rotor 166 and the casing 162, thereby forming relatively airtight spaces between the veins 174. Through the air lock opening 26 insulation material is dropped between the veins 174 and by rotation of the rotor 166, is carried downwardly to the bottom of the air lock 28 at which time the air flow through the air lock is maintained between inlet 180 and outlet 182 and the insulation is blown out the outlet 182 into the outlet hose 56. Pressure is maintained in the inlet 54 and outlet 56 hoses because of the air seal 176 between the veins 174 and the casing 162. Whenever an overfeed condition occurs beyond the conveying hoses capacity, the air back pressure will increase in the inlet hose 54 and a signal will be sent from the pressure transducer 90 to slow down the feed flow including the agitators 22 and the air lock 28. If the feed mechanism is totally shut off, the control circuitry of the invention shuts off both motor 70 and the agitators 22 and the air lock 28 and the auxiliary water pump 154 which is used to add moisture to the insulation material. The new and improved automatic pneumatic conveying machine of the invention performs as above described to save both fibrous material used and production time to place the material in the process of insulating buildings. Data was taken from the experimental use of the machine as described herein versus a commercially available machine of comparable size. The area insulated and thickness applied were identical for each set of tests. Tests 1–4 were used with a cellulosic insulation material in open space conditions. Tests 5–6 injected insulation into wall cavities through 1 and 2 inch diameter holes. The ampere draw of the insulation machine of the invention was typically 19% lower than the ampere draw of the conventional machine. Tests 1a through 6a utilized the machine of the invention. Tests 1b through 6b utilized the commercially available machine of comparable size. The performance data is shown in Table 1 herein below:

PERFORMANCE TEST DATA

| TEST NO. | DUCT FT. | LIFT FT. | IN-SULATION LBS. USED | PRO-DUCTION TIME MINS. | PERCENT SAVINGS PRO-DUCT | TIME |
|---|---|---|---|---|---|---|
| 1a-P | 150 | 12 | 1,125 | 29 | 6.3 | 17.1 |
| 1b-K2 | 150 | 12 | 1,200 | 35 | | |
| 2a-P | 200 | 20 | 18,350 | 705 | 7.0 | 13.0 |
| 2b-K2 | 200 | 20 | 19,750 | 810 | | |
| 3a-P | 350 | 20 | 2,850 | 102 | 27.4 | 45.1 |
| 3b-K2 | 350 | 20 | 3,925 | 186 | | |
| 4a-P | 150 | 20 | 2,825 | 66 | 2.6 | 31.2 |
| 4b-K2 | 150 | 20 | 2,900 | 96 | | |
| 5a-P | 125 | 15 | 1,450 | 468 | 7.9 | 47.1 |
| 5b-K2 | 125 | 15 | 1,575 | 885 | | |
| 6a-P | 150 | 20 | 875 | 126 | 10.3 | 46.1 |
| 6b-K2 | 150 | 20 | 975 | 234 | | |

Notes:
1 Tests identified as (P) were conducted utilizing a machine encompassing the technology described herein.
2 Tests identified as (K2) were conducted utilizing a commercially available machine of comparable size.
3 The area insulated and thickness applied were identical for each set of tests.
4 Tests 1a through 4b were applying cellulosic insulation in open space conditions.
5 Tests 5a through 6b were applications that injected insulation into wall cavities through one and two inch diameter holes.
6 It should be noted that the amperes draw of the (P) machine was typically 19.0 percent lower than the (K2) machine.

By the improved pneumatic conveying machine 10 of the invention, fibrous materials having uniform consistency and moisture content can be applied more efficiently and more consistently than heretofore possible. The rate of material applied can be more uniformly controlled as the feed rate of the material is automatically controlled by the air pressure within the system as the density and other properties of the material of field conditions varies. The machine 10 of the invention allows for fibrous material to be applied as desired more efficiently using less power and significantly less man-hours. While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. An pneumatic conveying machine comprising a material feeder, said feeder having a discharge opening, an air lock operatively connected to said feeder whereby material is discharged through said discharge opening into said air lock, a blower operatively connected to said air lock, an air duct operatively connected to said air lock, said feeder and air lock being operable at varying speeds to feed material to said air duct at a rate inversely proportional to the air pressure in said air duct, whereby said material can be further reduced in density and suspended in an air stream and conveyed through said air duct continuously at maximum rate and consistently without overfeed or underfeed conditions in said air duct.

2. The pneumatic conveying machine of claim 1 further comprising a damper, said damper being manually closed and opened, said damper being between said feeder and said air lock, said damper being set to provide said discharge opening of a size which corresponds to maximum feed rate for the desired machine output.

3. The pneumatic conveying machine of claim 1 wherein said feeder is a hopper above said airlock, said hopper having an agitator thereon, said agitator comprising a plurality of spiral ribbon conveyors between which the material is conditioned, said conveyors circulate and recirculate the conditioned insulation material from remote positions in said hopper to and over said discharge opening.

4. The pneumatic conveying machine of claim 3 wherein said agitator includes a plurality of paddles extending radially from a plurality of spaced apart and parallel rotating shafts, said paddles being interleaved so as to condition the insulation material prior to gravitationally flowing through said discharge opening.

5. The pneumatic conveying machine of claim 1 wherein said air lock includes a drum, a rotor mounted for rotation within said drum, said rotor having generally radially extending veins, said rotor and said drum being generally coaxial, said veins having at their distal ends a seal, said seal providing an essentially air tight seal between said drum and said rotor veins defining air tight compartments within said air lock, said compartments each having an opening generally of the shape and size of said discharge opening and having an end opening generally of a size at least as large as the cross-sectional size of said air duct, said drum being positioned beneath said feeder and between opposite portions of said air duct, said rotor can be rotated to receive said insulation material from said feeder in said compartments and rotated to deliver said insulation material to said air duct without losing air pressure through said discharge opening.

6. The pneumatic conveying machine of claim 5 wherein the said rotor of the air lock has vanes bent at a compound angle to provide a progressive contact to the air lock opening.

7. The pneumatic conveying machine of claim 5 wherein said rotor is operatively connected to a variable speed motor, said rotor being driven at various speeds proportional to the rate of flow of air through said air duct.

8. The pneumatic conveying machine of claim 1 further comprising a check valve in said air duct, said check valve being between said blower and said air lock, a pressure transducer operatively connected to said air duct between said blower and said check valve to sense the air pressure in said air duct, said pressure transducer being operatively connected to a PID process controller, said PID processor controller regulating the speed of said agitators and said air lock to rotate said air lock and agitator at a speed to maintain a generally constant predetermined pressure in said air duct before said check valve, whereby materials are fed to said air duct at a relatively constant rate of flow without creating overfeed or underfeed conditions in said air duct.

9. The pneumatic conveying machine of claim 8 further comprising a damper, said damper being movable between closed and opened positions, said damper being between said feeder and said air lock, said damper being set to provide said discharge opening of a size which corresponds to the maximum feed rate for the desired machine output wherein said PID process control system automatically adjusts said damper to maintain a generally constant back pressure in said air ducts when said air lock and agitators operate at a constant speed.

10. The pneumatic conveying machine of claim 8 further comprising an integrated PID function with a variable speed motor controller operatively connected to said agitators and with a motor controller operatively connected to said air lock and to said pressure transducer, said controller including a variable speed gearmotor operatively connected to said air lock and said agitators and a motor controller operatively connected to said motor and said pressure transducer, said PID motor controller having a pressure set point which said motor controller and pressure transducer strive to equal in said air duct by driving said motor and in turn said air duct and said agitator to maintain the air pressure in said air duct at said set point.

11. The pneumatic conveying machine of claim 10 further comprising a liquid pump, a motor driving said pump, a motor controller operatively connected to said pump motor, said liquid pump motor controller and said air lock motor controller being operatively connected to said agitator motor controller to shut down said air lock and agitator and said pump whenever the pressure in said air duct exceeds said predetermined pressure set point of said feed motor controller.

12. The pneumatic conveying machine of claim 11 wherein said pump motor and said pump motor controller are distinct from said agitator and air lock motor and its motor controller and said blower motor and its motor controller.

13. The pneumatic conveying machine of claim 11 wherein said pump motor and said pump motor controller are distinct from said agitator and air lock motor and its motor controller and said blower motor and its motor controller, a damper, said damper being manually closed and opened, said damper being between said feeder and said air lock, said damper being set to provide said discharge opening of a size which corresponds to maximum feed rate for blower output.

14. The pneumatic conveying machine of claim 11 wherein said pump motor and said pump motor controller are distinct from said agitator and air lock motor and its motor controller and said blower motor and its motor controller, a damper, said damper being manually closed and opened, said damper being between said feeder and said air lock, said damper being set to provide said discharge opening of a size which corresponds to maximum feed rate for machine output, said agitator comprises a plurality of spiral ribbon agitators between which the material is conditioned, said agitators move the conditioned material from remote positions in said hopper to said discharge opening.

15. The pneumatic conveying machine of claim 11 wherein said pump motor and said pump motor controller are distinct from said agitator and air lock motor and its motor controller and said blower motor and its motor controller, a damper, said damper being manually closed and opened, said damper being between said feeder and said air lock, said damper being set to provide said discharge opening of a size which corresponds to maximum feed rate for machine output, said insulation agitator includes a plurality of paddles extending radially from a plurality of spaced apart and parallel rotating shafts, said paddles being interleaved so as to condition the insulation material prior to gravitationally flowing through said discharge opening.

16. The pneumatic conveying machine of claim 11 wherein said pump motor and said pump motor controller are distinct from said agitator and air lock motor and its motor controller and said blower motor and its motor controller, a damper, said damper being manually closed and opened, said damper being between said feeder and said air lock, said damper being set to provide said discharge opening of a size which corresponds to maximum feed rate for machine output, wherein said agitator comprises a plurality of spiral ribbon agitators between which the material is conditioned, said agitators move the conditioned material from remote positions in said hopper to and over said discharge opening, said air lock includes a drum, a rotor mounted for rotation within said drum, said rotor having generally radially extending veins, said rotor and said drum being generally coaxial, said veins having at their distal ends a seal, said seal providing an essentially air tight seal between said drum and said rotor veins defining air tight compartments within said air lock, said compartments each having an opening generally of the shape and size of said discharge opening and having an end opening generally of a size at least as large as the cross-sectional size of said air duct, said drum being positioned beneath said hopper and between opposite portions of said air duct, said rotor being rotated to receive said insulation material from said feeder in said compartments and rotated to deliver said insulation material to said air duct without losing air pressure through said discharge opening.

17. The pneumatic conveying machine of claim 11 wherein said pump motor and said pump motor controller are distinct from said agitator and air lock motor and its motor controller and said blower motor and its motor controller, a damper, said damper being manually closed and opened, said damper being between said feeder and said air lock, said damper being set to provide said discharge opening of a size which corresponds to maximum feed rate for machine output, said agitator includes a plurality of paddles extending radially from a plurality of spaced apart and parallel rotating shafts, said paddles being interleaved so as to condition the material prior to gravitationally flowing through said discharge opening, said air lock includes a drum, a rotor mounted for rotation within said drum, said rotor having generally radially extending veins, said rotor and said drum being generally coaxial, said veins having at their distal ends a seal, said seal providing an essentially air tight seal between said drum and said rotor veins defining air tight compartments within said air lock, said compartments each having an opening generally of the shape and size of said discharge opening and having an end opening generally of a size at least as large as the cross-sectional size of said air duct, said drum being positioned beneath said hopper and between opposite portions of said air duct, said rotor being rotated to receive said material from said hopper in said compartments and rotated to deliver said material to said air duct without losing air pressure through said hopper discharge opening.

18. The pneumatic conveying machine of claim 11 wherein said hopper has a capacity of about 5 to 4000 cubic feet and said air duct is about one to six inches in diameter and the flow rate of said materials can be varied.

19. The pneumatic conveying machine of claim 10 wherein said insulation agitator and said air lock are driven by the same variable speed motor and motor controller.

20. The pneumatic conveying machine of claim 10 wherein said blower is driven by a variable speed motor and a motor controller, said blower motor and blower motor controller being distinct from the motor and motor controller of said agitator and air lock.

21. The pneumatic conveying machine of claim 1 wherein said hopper has a capacity of 130 pounds and said air duct is three inches in diameter and the flow rate of said insulation material can be varied between 100 pounds and 3,000 pounds per hour.

22. An air lock for use between a material feeder and a pneumatic material conveyer comprising the pneumatic conveying machine of claim 1 wherein said air lock includes a drum, a rotor mounted for rotation within said drum, said rotor having generally radially extending veins, said rotor and said drum being generally coaxial, said veins having at their distal ends a seal, said seal providing an essentially air tight seal between said drum and said rotor veins defining air tight compartments within said air lock, said compartments each having an opening generally of the shape and size of said hopper discharge opening and having an end opening generally of a size at least as large as the cross-sectional size of said air duct, said drum being positioned beneath said hopper and between opposite portions of said air duct, said rotor being rotated to receive said insulation material from said hopper in said compartments and rotated to deliver said insulation material to said conveyer without losing air pressure through said hopper discharge opening.

23. The airlock of claim 22 wherein said rotor of said air lock has veins bent at a compound angle to provide a progressive contact to said air lock opening.

24. The air lock of claim 22 wherein said rotor is operative connected to a variable speed motor, said motor being driven at various speeds proportionate to the rate of flow of material through said air duct.

25. A pneumatic insulation conveying machine comprising an insulation feeder having a discharge opening, an air lock operatively connected to said feeder whereby insulation material is discharged through discharge opening into said air lock, a blower operatively connected to said air lock, an air duct operatively connected to said blower, said hopper, feeder and air lock being rotatable at varying speeds to feed insulation material to said air duct at a rate inversely proportional to the air pressure in said air duct, whereby said insulation material can be further reduced in density, suspended in an air stream, and blown through air duct continuously and consistently at a maximum rate without plugging said air duct.

26. A pneumatic insulating conveying machine comprising an insulation feeder, a discharge opening, and an air lock operatively connected to said feeder, whereby insulation material, reduced in density, is discharged through said opening into said air lock, a blower operatively connected to said air lock, an air duct operatively connected to said air lock, said feeder and said air lock rotatable at varying speeds to feed insulation to said air duct at a rate inversely proportional to the air pressure in said air duct, whereby insulation material can be further reduced in density and suspended in an air stream and conveyed through said air duct continuously at a maximum rate and consistently without overfeed or underfeed conditions in said air duct.

27. A controller for use in a pneumatic conveying machine having a feeder, an air lock, and a pneumatic conveying device operatively connected together with said air lock between said feeder and said conveying device, said conveying device having an air duct, and a blower, a check valve in said air duct, said check valve being between said air blower and said air lock, a pressure transducer operatively connected to said air duct, between said blower and said check valve to sense the air pressure in said air duct, said pressure transducer being operative connected to a process controller, said process controller regulating the speed of said feeder and said air lock to operate said air lock and feeder at a speed to maintain generally constant predetermined pressure in said air duct before said check valve, whereby conveyer is operated at a relatively constant rate of flow without creating overfeed or underfeed conditions in said air duct.

28. The controller of claim 27 further comprising a water pump, a motor driving said water pump, a motor controller operatively connected to said motor, said water pump motor controller and said air lock motor controller being operatively connected to said blower motor driver to shut down said air lock and insulation feeder and said water pump whenever the pressure in said air duct exceeds said predetermined pressure set point of said blower motor controller.

29. The controller of claim 28 wherein said insulation feeder and said air lock are driven by the same variable speed motor and its motor controller.

* * * * *

UNITED STATES PATENT AND TRADEMARK OFFICE
Certificate

Patent No. 6,092,747            Patented: July 25, 2000

On petition requesting issuance of a certificate for correction of inventorship pursuant to 35 U.S.C. 256, it has been found that the above-identified patent, through error and without deceptive intent, improperly sets forth the inventorship.

Accordingly, it is hereby certified that the correct inventorship of this patent is: Milton L. Gerber, Ossian, Indiana.

Signed and Sealed this Ninth Day of October, 2001.

ALLEN M. OSTRAGER
*Supervisory Patent Examiner*
Art Unit 3725